United States Patent [19]

Galloway et al.

[11] Patent Number: 4,529,676

[45] Date of Patent: Jul. 16, 1985

[54] ELECTROCHEMICAL CELL

[75] Inventors: Roy C. Galloway, Pretoria, South Africa; Roger J. Bones, Abington, England; David A. Teagle, Swindon, England; Michael L. Wright, Allestree, England

[73] Assignee: South African Inventions Development Corporation, South Africa

[21] Appl. No.: 612,656

[22] Filed: May 21, 1984

[30] Foreign Application Priority Data

May 23, 1983 [GB] United Kingdom ............... 8314235

[51] Int. Cl.$^3$ ............................................ H01M 4/36
[52] U.S. Cl. .................................. 429/103; 429/104; 429/221; 429/223; 429/224; 29/623.1
[58] Field of Search .................................. 429/101–103, 429/221, 223, 224, 218, 104; 29/623.1

[56] References Cited

U.S. PATENT DOCUMENTS 4,287,269  9/1981  Coetzer et al. ..................... 429/103
4,452,777  6/1984  Abraham et al. ............... 429/103 X Primary Examiner—Charles F. LeFevour
Attorney, Agent, or Firm—Arnold, White & Durkee

[57] ABSTRACT

The invention provides a method of making a cathode for an electrochemical cell which involves incorporating sodium chloride in dispersed form into an electrolyte permeable matrix and impregnating the matrix with a suitable sodium aluminum halide molten salt electrolyte. The matrix is formed from a transition metal selected from at least one member of the group consisting of Fe, Ni, Co, Cr and Mn, and the intermediate refractory hard metal compounds of said transition metals with at least one non-metal selected from the group consisting of carbon, silicon, boron, nitrogen and phosphorus.

14 Claims, 4 Drawing Figures

ELECTROCHEMICAL CELL

This invention relates to an electrochemical cell. In particular it relates to a method of making a cathode for an electrochemical cell, to such cathode when made according to the method, and to an electrochemical cell including the cathode.

According to the invention there is provided a method of making a cathode suitable for an electrochemical cell of the type comprising a sodium anode which is molten at the operating temperature of the cell, a sodium aluminium halide molten salt electrolyte which is also molten at the operating temperature of the cell, a cathode which is in the form of an electronically conductive electrolyte permeable matrix impregnated with the electrolyte, and, between the anode and the electrolyte and isolating the anode from the electrolyte, a solid conductor of sodium ions or a micromolecular sieve which contains sodium sorbed therein, the proportion of sodium ions and aluminium ions in the electrolyte being selected so that the solubility of the active cathode substance in the molten electrolyte is at or near its minimum, the method comprising incorporating sodium chloride (NaCl) in dispersed form in an electrolyte permeable matrix formed from at least one member of the group consisting of Fe, Ni, Co, Cr and Mn and the intermediate refractory hard metal compounds of said transition metals with at least one non-metal of the group consisting of carbon, silicon, boron, nitrogen and phosphorus, and impregnating the matrix with a suitable sodium aluminium halide molten salt electrolyte.

When the matrix comprises at least one said transition metal it is, once said electrolyte is impregnated therein and the NaCl is incorporated therein, a discharged cathode ready for immediate use in an electrochemical cell coupled via a suitable electrolyte with a suitable anode. When the matrix comprises at least one said intermediate refractory hard metal compound it is, once said electrolyte has been impregnated therein and the NaCl is incorporated therein, a cathode precursor which can be coupled with a suitable anode and which becomes a cathode after it has been subjected to at least one charge cycle.

The method may include forming the matrix from at least one member of the group consisting of said transition metals and intermediate refractory hard metal compounds. Forming the matrix may comprise sintering particles such as powders or fibres thereof in a reducing atmosphere. Instead, forming the matrix may comprise forming a particulate mixture thereof with an organic binder, pressing the mixture into a unitary body and cracking the binder by heating the mixture under vacuum at a temperature above 400° C. which is sufficient to pyrolise the binder. For example, a carbide of the transition metal in question can be mixed with a small quantity of a carbon-forming organic binder such as a phenolformaldehyde resin, the resulting mix being pressed into an electrode shape, and the resin cracked in a vacuum at a temperature above 600° C., which temperature is selected to pyrolyse the binder to conductive carbon.

Incorporating the NaCl into the matrix may be effected simultaneously with the formation of the matrix, the NaCl in finely divided particulate form being dispersed into the particulate material from which the matrix is formed, prior to formation of the matrix. Instead, the NaCl may be incorporated into the matrix by immersing the matrix in an aqueous NaCl solution, followed by drying; or the NaCl may be incorporated into the matrix by melting the electrolyte and suspending particulate NaCl in finely divided form in the molten electrolyte prior to impregnating the electrolyte into the matrix, and then impregnating the electrolyte together with the NaCl suspended therein, into the matrix. It is apparent from the aforegoing that the NaCl may be incorporated into the matrix in any one of a number of suitable different ways, and it may even be incorporated into the matrix simply by impregnating molten NaCl into the matrix, for example by capillary action and wicking.

When the NaCl is introduced by immersion, this may be by a repetitive process of successive immersions in an aqueous NaCl solution, followed by successive dryings in a vacuum oven.

Impregnating the molten salt electrolyte into the matrix may in turn also be by means of vacuum impregnation with the electrolyte in a molten state.

The cathode when formed as described above from a transition metal will be in its discharged state, and can then be assembled directly into an electrochemical cell.

If the cathode has been formed from an intermediate refractory hard metal compound matrix, the cathode can be assembled into a cell, typically after it has been subjected to a number of charge/discharge cycles as a cathode in an electrochemical cell (not necessarily the cell in which it is eventually to be used), to condition and activate it by halogenation of the intermediate refractory hard metal compound so that the cathode is ready for immediate use in the eventual cell of which it forms part. When this type of cathode is not conditioned prior to assembly into the cell in which it is eventually intended to be used, but is loaded directly into such cell, conditioning by subjecting it to charge/discharge cycles in this cell will be necessary to activate it by halogenation of the intermediate refractory hard metal compound to bring the cathode up to its maximum potential operating performance in the cell.

According to Van Nostrand's Scientific Encyclopedia a convenient classification of the binary compounds of carbon, is into ionic or salt-like carbides, intermediate carbides, interstitial carbides, and covalent binary carbon compounds.

Further, in the same referencee, it is stated that by the term intermediate carbides, is meant compounds intermediate in character between the ionic carbides and the interstitial carbides. The intermediate carbides, such as those of chromium, manganese, iron, cobalt and nickel, are similar to the ionic carbides in that they react with water or dilute acids to give hydrocarbons, and they resemble the interstitial carbides in their electrical conductivity, opacity and metallic lustre.

These five metal carbides are therefore recognised as a distinct group, as are, in the same way, the borides, nitrides, silicides and phosphides of these five metals.

It is for this reason that the refractory hard metal compounds of this invention have been identified in this specification as intermediate refractory hard metal compounds.

The metals comprising chromium, manganese, iron, cobalt and nickel are unique in that their atomic radii obtained according to Goldschmidt and Pauling ("Refractory Hard Metals" (1953)—Schwarzkopf and Kieffer pp 12, 13) are in the range of 1.24 to 1.27 Angstrom units. Their atomic radii are therefore significantly smaller than those of other metals which form refractory hard metals.

In the same reference mention is made of Hágg's observation that the carbides of these five metals, because of the small atomic radii of the metals, have radius ratios (carbon radius:metal radius) slightly greater than 0.59 and hence have complicated structures. For the other transition metals where the ratio if below 0.59, the observed structures can in all instances be described as a close packed arrangement of metal atoms with carbon atoms in the interstices of the lattice.

In Linus Pauling's theory of the metallic bond a key postulate is that inter-atomic distance is a measure of bond strength and thus of the number of electron pairs resonating between the positions available in the metal crystal. For the first long period of the priodic table, the radii observed in the respective metal crystals indicate that the number of resonating bonds—that is, in Pauling's theory, the metallic valence of the atom—increases from 1 to 5.78 in series K, Ca, Sc, Ti, V, Cr; remains at 5.78 for Mn, Fe, Co, and Ni; and begins to fall with Cu. In addition, only Cr, Mn, Fe, Co and Ni possess an excess of electrons available for occupancy of the atomic d-orbitals after the required number of bonding electrons is deducted from the outer electron total.

Pauling has applied the above theory to explain the unusual structures of the mono silicides of chromium, manganese, iron, cobalt and nickel, and inferred that they form a series in which the metallic orbitals involved in forming the metal-silicon bonds display an increasing amount of d-character.

While available thermo-dynamic data on metal borides, silicides and phosphides is somewhat meagre, nevertheless there is sufficient data to detect simple trends in heats of formation and melting points. The values for the compounds of chromium, manganese, iron, cobalt and nickel are seen to be considerably lower than titanium and vanadium, and show only moderate variation.

Because different theoretical approaches to electron configuration and bonding in refractory hard metals have been postulated, an because their crystal chemistry displays great diversity, it is not possible, purely on theoretical considerations, to explain categorically why intermediate refractory hard metal compounds of chromium, manganese, iron, cobalt and nickel exhibit sufficient electrochemical activity for use as cathodes, while refractory hard metal compounds of certain related transition elements do not work under corresponding experimental conditions.

Nevertheless, without wishing to be bound by theory, Applicants believe that this distinction may be justified, and the classification of these metals as a group may be justified, on the basis of some of the evidence which has been obtained. In addition, from the practical point of view, the experiments conducted by Applicants have shown that the majority of intermediate refractory hard metal compounds of this invention exhibit electrochemical activity whereas refractory hard metal compounds of certain other transition metals do not exhibit sufficient electrochemical activity under the same conditions to warrant their consideration as cathodes in electrochemical cells.

The invention extends to a cathode for an electrochemical cell, whenever made in accordance with the method described above; and the invention extends also to an electrochemical cell comprising such cathode, together with a compatible anode, the anode and the cathode being coupled together by a compatible electrolyte.

In particular, the invention extends to an electrochemical cell in which the anode is a sodium anode which is molten at the operating temperature of the cell, and in which the electrolyte is the same sodium aluminium halide molten salt electrolyte as that with which the cathode matrix is impregnated and is molten at the operating temperature of the cell, there being a solid conductor of sodium ions or a micromolecular sieve which contains sodium sorbed therein between the anode and the electrolyte and isolating the anode from the electrolyte, and the proportions of sodium ions and aluminium ions in the electrolyte being selected so that the solubility of the active cathode substance in the molten electrolyte is at or near its minimum.

Figure 1:
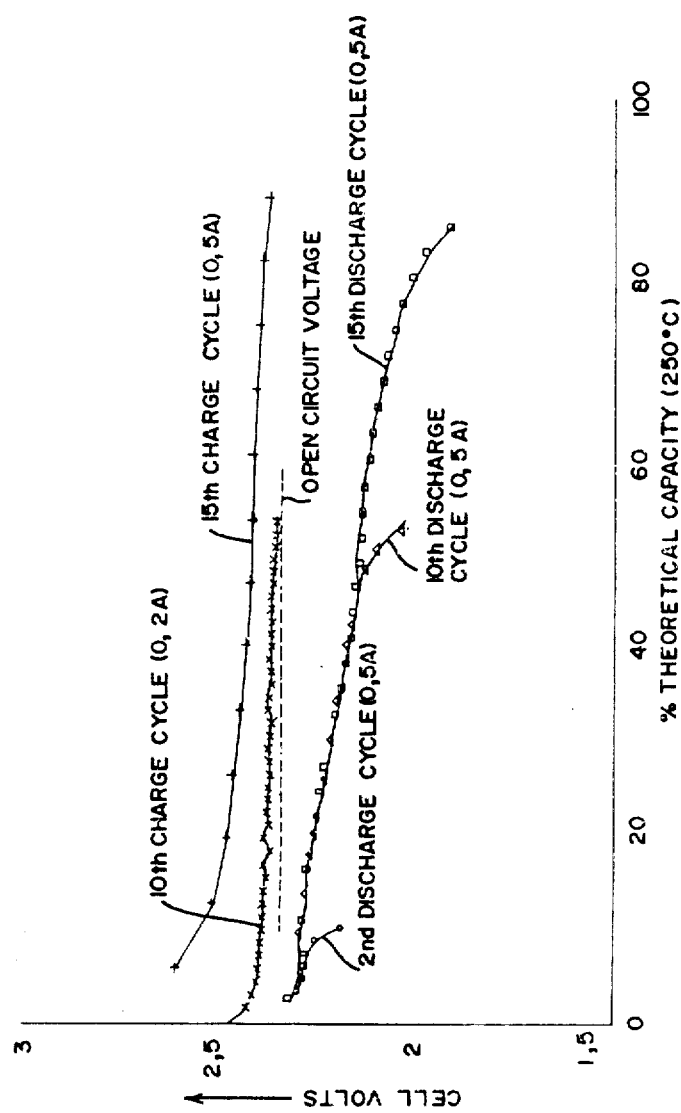
FIG. 1 is a plot of selected cell cycling curves during the first 15 cell cycles of a cell in accordance with Example 1 of the present invention.

Preferably, even if the cathode has been made from a matrix comprising a transition metal, the cell will have been subjected to a plurality of charge/discharge cycles to condition the cathode. A small amount of sodium is provided on the anode side of the solid conductor or sieve, when the cathode is loaded in the discharged state to provide good wetting.

When a solid conductor isolates the anode from the molten salt electrolyte, this solid conductor may be selected from the group consisting of nasicon and beta alumina. The molten salt electrolyte in turn, as mentioned above, is preferably a sodium aluminium chloride based electrolyte.

With regard to the solid conductor or micromolecular sieve, 'isolating' means that any ionic sodium or metallic sodium moving from the anode to the electrolyte, or vice versa, has to pass through the internal crystal structure of the solid conductor or through the microporous interior of the micromolecular sieve, as the case may be.

As a molten salt electrolyte, sodium aluminium chloride can, depending on the proportions of sodium and aluminium, have a melting point of the order of 150° C. or less, and, also depending on its composition, the active cathode substance can be virtually insoluble therein, and these features are desirable.

This electrolyte may contain a minor proportion of up to, say, 10% by mass and usually less, of a dopant such as an alkali metal halide other than sodium chloride, by means of which its melting point is reduced. The dopant may thus comprise an alkali metal fluoride, but the proportions of the constituents of the electrolyte should be selected such that the solubility of the active cathode substance in the electrolyte is kept to a minimum.

The Applicant has found that the minimum solubility of the active cathode substances in the sodium aluminium chloride electrolytes (which may be doped as described above), occurs when the molar ratio of the alkali metal halide to the aluminium halide is about 1:1. In other words, the relative quantities of said alkali metal ions, aluminium ions and halide ions should conform substantially with the stoichiometric product:

MAlX$_4$ wherein

M represents alkali metal cations; and

X represents halide anions.

Such electrolytes are a mong those described in U.S. Pat. No. 4,287,271.

In this way, the proportions of the constituents can be selected so that the melting point of the electrolyte at atmospheric pressure is below 140° C. Minor proportions of dopants may be tolerated in the electrolyte, e.g. substances which will ionize in the molten electrolyte to provide ions which affect the electrolytic action of the electrolyte or, as mentioned above, substances which reduce its melting point, but their nature and quantity should be insufficient to alter the essential character of the electrolyte as a sodium aluminium chloride electrolyte, wherein the MAlX$_4$ product is maintained.

When the cell contains a micromolecular sieve this can be regarded as a conductor of sodium metal and/or sodium ions, depending on the mechanism whereby sodium is transported therethrough.

By 'micromolecular sieve' is meant a molecular sieve having interconnected cavities and/or channels in its interior and windows and/or pores in its surface leading to said cavities and channels, the windows, pores, cavities and/or channels having a size of not more than 50 Angstroms and preferably less than 20 Angstroms.

Suitable micromolecular sieves are mineral micromolecular sieves, ie inorganic lattice or framework structures such as tectosilicates, eg the zeolites 13X, 3A, 4A or the like, although certain essentially organic micromolecular sieves such as clathrates may, in certain circumstances, be suitable.

The active cathode substance should preferably be evenly dispersed throughout the matrix; and it may be in finely divided particulate form and/or it may adhere as fine particles or a thin layer to the matrix, preferably so that there are no large particles or thick layers of active cathode substance present, and preferably so that none of the active cathode substance is placed physically from the material of the matrix, which acts as a current collector, by an excessive spacing, eg in large cavities in the matrix. In other words, the active cathode substance preferably should be close to or adherent to the material of the matrix, and should be as thinly spread as possible, consistent with the porosity of the matrix and the quantity of cathode substance required to be present. Large particles or thick layers of active cathode substance will not prevent the cell from working, but will merely be inefficient, a proportion of the active cathode substance remote from the cathode material amounting merely to dead weight.

In practice, after assembly of the cell in the form described above with its cathode in the discharged state, the cell will be heated to its operting temperature which will be in the region of 150°–500° C., typically 250°–350° C., and the cathode will be conditioned electrochemically, by subjecting it to the abovementioned charge/discharge cycles. Preferably the charging of a cell is at a low rate, typically in the region of 5 mAcm$^{-2}$ to a voltage limit of about 0.15 V above the equilibrium open circuit voltage of the cell. If the transition metal or metals in question are represented by M, the reaction upon charging can be represented as follows:

$$M + 2NaCl \rightarrow MCl_2 + 2Na$$

For example, the open circuit voltage for Fe/FeCl$_2$//Na is 2.35 V at 250° C.; and the open circuit voltage for Ni/NiCl$_2$//Na is 2.59 V at 250° C.

During the conditioning the cell is discharged, typically also at a low rate of about 15 mAcm$^{-2}$, each time to a voltage of about 0.5 V below the equilibrium open circuit voltage. Repeated cycling under these charging and discharging conditions is continued for as long as necessary until the cathode has been conditioned, eg up to about 30 cycles. Conditioning results in a stable reversible capacity in excess of about 85% of the theoretical capacity based on the weight of NaCl added. The cell can then be operated, eg as a power storage cell, at much higher current densities of the order of up to about 150 mAcm$^{-2}$ on discharge, and up to 50 mAcm$^{-2}$ upon charge.

Instead of conditioning at a fixed charging and discharging rate during each conditioning cycle, it is possible gradually to increase the current densities during the conditioning cycles, as the conditioning process progresses.

The invention will now be described, with reference to the following non-limiting illustrative examples:

EXAMPLE 1

A porous matrix was prepared by sintering iron powder. The matrix was 14 mm thick and was 65% porous, ie 65% of its internal volume comprised interconnected cavities and channels communicating with pores at its surface.

A suspension of finely divided NaCl (substantially finer than the pores of the matrix) in molten NaAlCl$_4$ (an equimolar mixture of NaCl and AlCl$_3$) was prepared. The proportion of NaCl in the NaAlCl$_4$ was about 40% by mass and the particle size of the NaCl was about 20 microns. The matrix was then saturated with this molten suspension by vacuum impregnation.

The discharged Fe/FeCl$_2$ cathode so prepared was assembled into a test cell having a sodium anode, a beta alumina solid electrolyte between the anode and cathode, and a liquid electrolyte comprising said NaAlCl$_4$ between the beta alumina and the cathode and saturating the cathode.

The cell so formed was then subjected to a plurality of charge/discharge cycles at 250° C., using a charging current of 0.1–0.2 A (about 5–10 mAcm$^{-2}$) to a voltage limit of about 0.15 V above the equilibrium open circuit voltage of about 2.35 V for Fe/FeCl$_2$//Na at 250° C.; and a discharge current of 0.5 A to a voltage about 0.5 V below said equilibrium open circuit voltage.

In FIG. 1 a plot is shown of selected cell cycling curves during the first 15 cell cycles, cell voltage being plotted against % theoretical capacity. In FIG. 1 the second, tenth and fifteenth discharge curves are shown, and the tenth and fifteenth charge curves.

Figure 2:
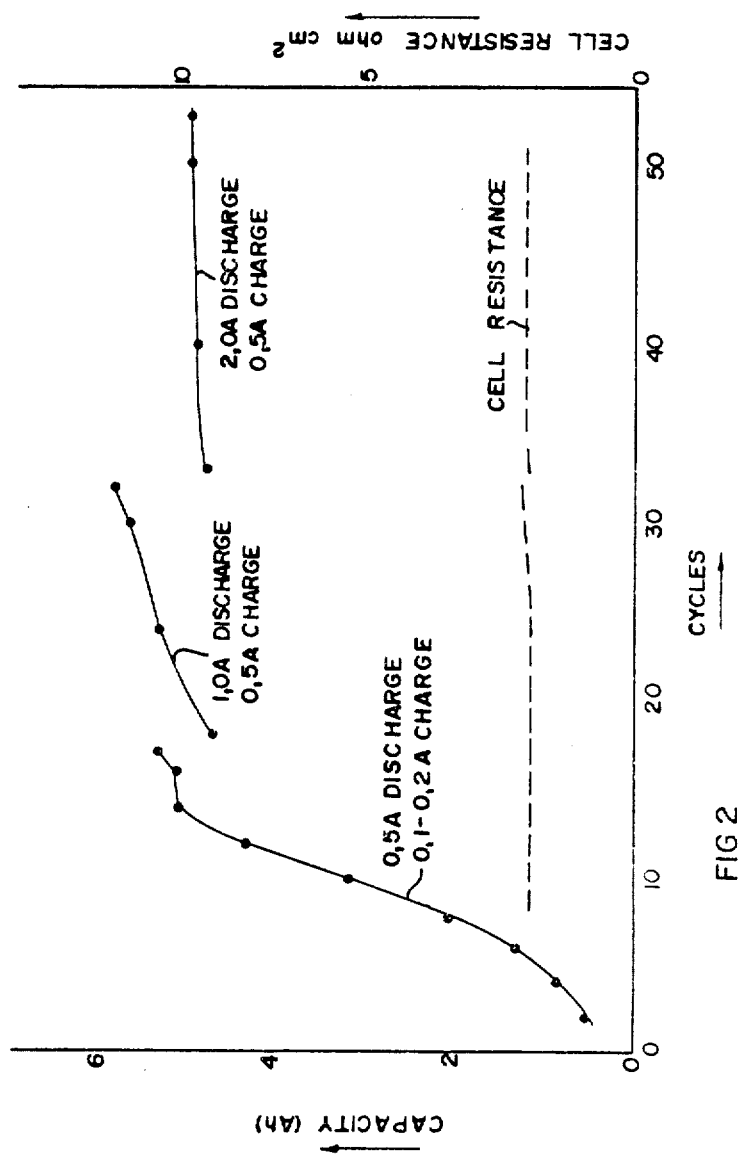
FIG. 2 is a plot of capacity and cell resistance versus number of cell cycles, in accordance with the embodiment of Example 1 hereof.

After about the fifteenth to the seventeenth cycle the cell was cycled for a further fifteen cycles at a charging rate of about 0.5 A and a discharge rate of about 1.0 A between the same voltage limits as during initial conditioning. After said total of thirty-two cycles the cell was regarded as fully conditioned and it was then operated for a further eleven cycles at a charge rate of 0.5 A and a discharge rate of 2.0 A. A plot of capacity (Ah) and cell resistance (ohm cm$^2$) against the number of cycles is shown in FIG. 2.

After said 15 cycles the cathode was found to have a reversible capacity of the order of 85% of its theoretical capacity and after said 32 cycles the cathode had a stable reversible capacity in excess of 85% of its theoretical capacity. It is believed that a similar conditioning at 300° C. would after substantially fewer, eg about five, cycles, be similar to fifteen cycles at 250° C. as raising cell temperature reduces the number of cycles required.

EXAMPLE 2

A nickel-based cathode according to the invention was prepared from a 2 mm thick nickel matrix formed from sintered nickel powder to have a porosity of about 80% and NaCl was incorporated in the matrix by repeated immersion of the matrix in a saturated aqueous NaCl solution followed by drying in a vacuum oven, until the matrix underwent a weight gain of about 40%.

Figure 3:
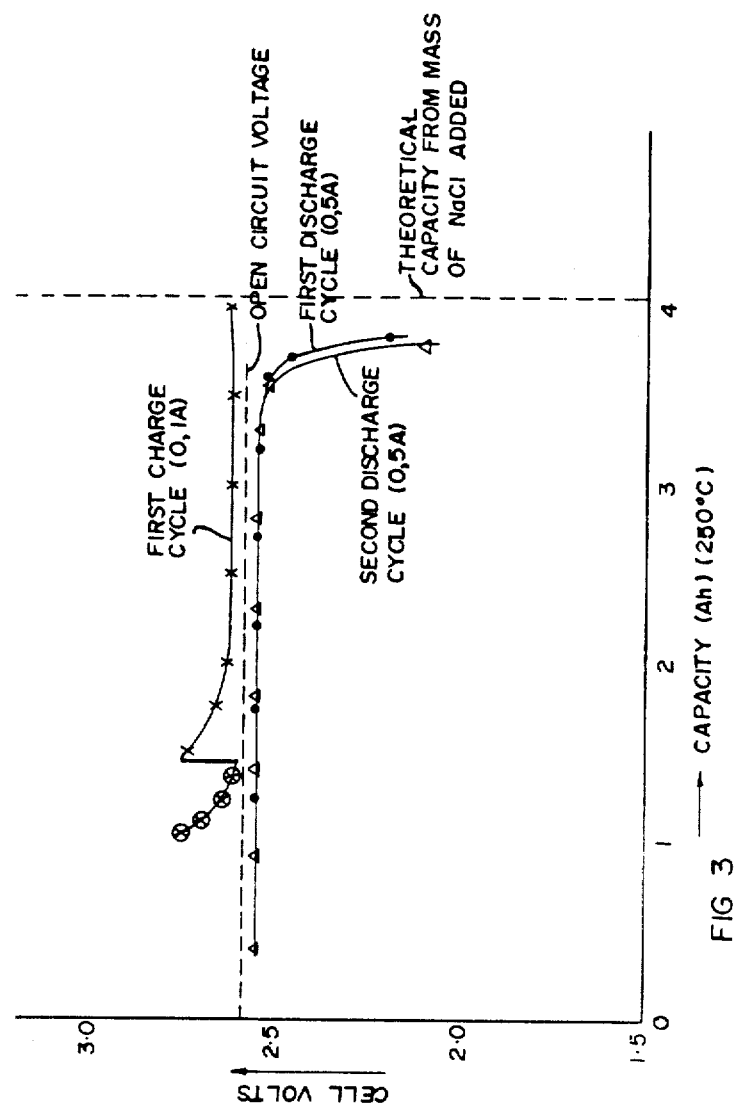
FIG. 3 is a plot of selected cycling curves of a cell in accordance with the embodiment of Example 2 hereof.

The cathode was assembled into a celll described for Example 1, and subjected to conditioning by charge/discharge in the same fashion as for Example 1 (charging at 0.1 A (about 5 mAcm$^{-2}$) and discharging at 0.5 A). Almost immediately, it was found to have a capacity of over 85% of the theoretical capacity (FIG. 3).

EXAMPLE 3

Another nickel-based cathode was prepared by mixing sodium chloride and nickel powder (in a mass ratio of about 1:2.5) into an aqueous slurry and moulding around a nickel sheet current collector. After drying, the cathode was sintered under hydrogen at up to 800° C. for 5 hours. The cathode was impregnated with molten NaAlCl$_4$ (equimolar mixture of NaCl and AlCl$_3$) and then loaded into a cell as described above.

Figure 4:
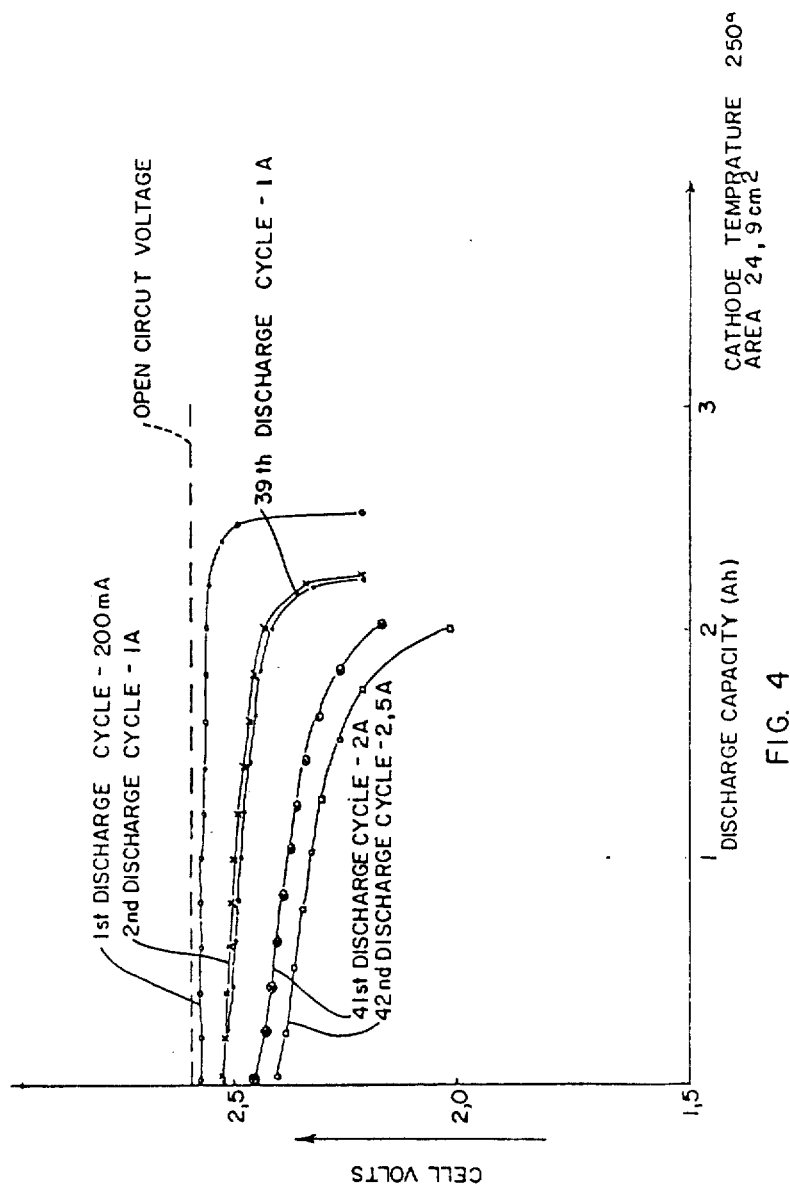
FIG. 4 is a plot of selected cycling curves of a cell in accordance with the embodiment of Example 3 of the present invention.

The cell temperature was kept constant at 250° C. and for the first 4 cycles a slow charge at 100 mA (4 mAcm$^{-2}$) to 2.8 V yielded a capacity of 2.86 Ah of which 2.5 Ah was recovered at 200 mAh (8 mAcm$^{-2}$) (FIG. 4). The charge rate was increased to 400 mA (16 mAcm$^{-2}$) and discharge rates increased to 800 mA (32 mAcm$^{-2}$) from cycle 5 to cycle 18 during which a fall off in capacity was observed to a value of 2.2 Ah. Performance remained steadily from cycle 19 to 39 with an increased discharge rate of 1 A (40 mAcm$^{-2}$). Discharge cycle 41 (2 A) and discharge cycle 42 (2.5 A) still gave a capacity of more than 2 Ah (80% of first discharge).

It should finally be noted that the Applicant contemplates that conditioning a matrix comprising a porous sintered mixture of two or more of Fe, Ni, Co, Cr and Mn is perfectly feasible, to form a cathode according to the invention.

We claim:

1. A method of making a cathode suitable for an electrochemical cell of the type comprising a sodium anode which is molten at the operating temperature of the cell, a sodium aluminium halide molten salt electrolyte which is also molten at the operating temprature of the cell, a cathode which is in the form of an electronically conductive electrolyte permeable matrix impregnated with the electrolyte, and, between the anode and the electrolyte and isolating the anode from the electrolyte, a solid conductor of sodium ions or a micromolecular sieve which contains sodium sorbed therein, the proportion of sodium ions and aluminium ions in the electrolyte being selected so that the solubility of the active cathode substance in the molten electrolyte is at or near its minimum, the method comprising incorporating sodium chloride in dispersed form into an electrolyte permeable matrix formed from at least one member of the group consisting of Fe, Ni, Co, Cr and Mn and the intermediate refractory hard metal compounds of said transition metals with at least one nonmetal of the group consisting of carbon, silicon, boron, nitrogen and phosphorus, and impregnating the matrix with a suitable sodium aluminium halide molten salt electrolyte.

2. A method as claimed in claim 1, which includes forming the matrix from at least one member of the group consisting of said transition metals and intermediate refractory hard metal compounds, by sintering particles thereof in a reducing atmosphere.

3. A method as claimed in claim 1, which includes forming the matrix from at least one member of the group consisting of said transition metals and said intermediate refractory hard metal compounds by forming a particulate mixture thereof with an organic binder, pressing the mixture into a unitary body and cracking the binder by heating the mixture under vacuum at a temperature above 400° C. which is sufficient to pyrolise the binder.

4. A method as claimed in claim 2, in which the NaCl is incorporated into the matrix simultaneously with the formation of the matrix, the NaCl in finely divided particulate form being dispersed into the particulate material from which the matrix is formed, prior to formation of the matrix.

5. A method as claimed in claim 1, in which the NaCl is incorporated into the matrix by immersing the matrix in an aqueous NaCl solution followed by drying.

6. A method as claimed in claim 1, in which the NaCl is incorporated into the matrix by melting the electrolyte and suspending particulate NaCl in finely divided form in the molten electrolyte prior to impregnating the electrolyte into the matrix, and then impregnating the electrolyte together with the NaCl suspended therein into the matrix.

7. A method as claimed claim 1, in which the NaCl is incorporated into the matrix by impregnation of molten NaCl into the matrix by capillary action and wicking.

8. A method as claimed in claim 1, in which impregnating the molten salt electrolyte into the matrix is by means of vacuum impregnation with the electrolyte in a molten state.

9. A cathode for an electrochemical cell whenever made in accordance with the method of any one of the preceding claims.

10. An electrochemicall cell which comprises a cathode as claimed in claim 9, and a compatible anode, the anode and cathode being coupled together by a compatible electrolyte.

11. A cell as claimed in claim 10, in which the anode is a sodium anode which is molten at the operating temperature of the cell and in which the electrolyte is the same sodium aluminium halide molten salt electrolyte as that with which the cathode matrix is impregnated and is molten at the operating temperature of the cell, there being a solid conductor of sodium ions or a micromolecular sieve which contains sodium sorbed therein between the anode and the electrolyte and isolating the anode from the electrolyte, and the proportions of sodium ions and aluminium ions in the electrolyte being selected so that the solubility of the active cathode substance in the molten electrolyte is at or near its minimum.

12. A cell as claimed in claim 11, which has been subjected to a plurality of charge/discharge cycles to condition the cathode.

13. A cell as claimed in claim 11, in which a solid conductor selected from the group consisting of nasicon and beta alumina isolates the anode from the molten salt electrolyte.

14. A cell as claimed in claim 11, in which the molten salt electrolyte is a sodium aluminium chloride electrolyte.

* * * * *